United States Patent
Carlsten

[19]

[11] Patent Number: 5,982,787
[45] Date of Patent: Nov. 9, 1999

[54] RIPPLED BEAM FREE ELECTRON LASER AMPLIFIER

[75] Inventor: Bruce E. Carlsten, Los Alamos, N.Mex.

[73] Assignee: The United States of America as represented by the United States Department of Energy, Washington, D.C.

[21] Appl. No.: 09/063,291

[22] Filed: Apr. 21, 1998

[51] Int. Cl.[6] ........................................................ H01S 3/00
[52] U.S. Cl. .................................. 372/2; 372/64; 372/82; 372/37; 372/33; 315/5
[58] Field of Search ................................... 372/2, 64, 37, 372/82; 315/5, 4

[56] References Cited

U.S. PATENT DOCUMENTS

| | | | |
|---|---|---|---|
| 4,298,824 | 11/1981 | Waish | 315/5 |
| 4,809,281 | 2/1989 | Neil et al. | 372/2 |
| 4,825,441 | 4/1989 | Marshall et al. | 372/2 |
| 4,835,446 | 5/1989 | Nation et al. | 315/5 |
| 5,015,914 | 5/1991 | Ives et al. | 315/5 |
| 5,280,490 | 1/1994 | Cinde et al. | 372/37 |
| 5,663,971 | 9/1997 | Carlsten | 372/2 |

*Primary Examiner*—Leon Scott, Jr.
*Attorney, Agent, or Firm*—Ray G. Wilson; William R. Moser; Paul A. Gottlieb

[57] ABSTRACT

A free electron laser amplifier provides a scalloping annular electron beam that interacts with the axial electric field of a $TM_{0n}$ mode. A waveguide defines an axial centerline and, a solenoid arranged about the waveguide produces an axial constant magnetic field within the waveguide. An electron beam source outputs a annular electron beam that interacts with the axial magnetic field to have an equilibrium radius and a ripple radius component having a variable radius with a ripple period along the axial centerline. An rf source outputs an axial electric field that propagates within the waveguide coaxial with the electron beam and has a radial mode that interacts at the electron beam at the equilibrium radius component of the electron beam.

6 Claims, 6 Drawing Sheets

RIPPLED BEAM FREE ELECTRON LASER AMPLIFIER

BACKGROUND OF THE INVENTION

This invention relates to free electron lasers (FELs) and, more particularly, to FELs using an axial interaction between an electron beam and an electric field. This invention was made with government support under Contract No. W-7405-ENG-36 awarded by the U.S. Department of Energy. The government has certain rights in the invention.

There has been a drive to both higher frequencies and higher output powers in modern microwave sources, with recent results ranging from 61 MW at 33 GHz (using a free-electron laser (FEL) interaction in a smooth waveguide) to 550 MW at 9.45 GHz (using slow-wave backward-wave interaction in a rippled waveguide). With conventional diode voltages (limited to <1 MV), the beam current must be very large (5–10 kA) in order to achieve peak output power in the range of hundreds of MW to several GW. With this large current, the electron beam must be made into a thin annulus and must travel close to beam pipe wall in order to reduce the effects of the beam's self space-charge forces. To attain high frequencies, these devices are commonly operated with non-fundamental radio frequency (rf) modes to reduce the beam-current density.

One class of interactions presently being studied is an annular beam interacting with the axial electric field of the rf modes in a waveguide with a sinusoidal-rippled outer radius. See, e.g., U.S. Pat. No. 5,663,971, *Axial Interaction Free-Electron Laser*, issued Sep. 2, 1997, and incorporated herein by reference. If the ripple period is sufficiently short, a slow-wave mode rf (the mode's phase velocity is slower than the speed of light) can be generated that matches the velocity of the beam's slow space-charge wave (the space-charge wave that has a phase velocity slightly slower than the electron's velocity). If the ripple period is sufficiently long, a fast-wave mode can be made synchronous with a harmonic of the beam's slow space-charge wave.

The slow-wave rf mode is constructed by reflections from the ripples, and the mode within the rippled structure has a very different radial profile than the modes in a smooth wave-guide. The axial electric field of the slow-wave mode has an $I_0$ Bessel function radial dependence (which is always nonzero), leading to an interaction for any annulus radius, including a solid beam. As a result of the mode's profile distortion, this interaction is more suited for an oscillator than an amplifier, and a backward-wave oscillator configuration has the most gain.

This limitation is side-stepped if the ripple period is long, because the radial profile of the rf mode within the rippled structure is now very close to the profile of the mode in a smooth waveguide with a radius equal to the mean radius of the rippled waveguide, and there is no awkward transition between the interacting mode and the corresponding mode in a smooth waveguide. As a result, this interaction, referred to as the axial free-electron laser interaction, is well suited for an amplifier. This interaction is only suited for an annular beam, and an on-axis solid beam will not have any net interaction with the rf. However, synchronism can be established only between the fast wave and the beam through a harmonic of the ripple wave number, which will lead to a relatively low interaction strength.

Accordingly, it is an object of the present invention to establish an amplification interaction between a fundamental rf mode and an annular, or off-axis, electron beam in a smooth waveguide.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

To achieve the foregoing and other objects, and in accordance with the purposes of the present invention, as embodied and broadly described herein, the apparatus of this invention may comprise a free electron laser amplifier. A waveguide defines an axial centerline and a solenoid arranged about the waveguide produces an axial constant magnetic field within the waveguide. An electron beam source outputs a annular electron beam that interacts with the axial magnetic field to have an equilibrium radius component and a ripple radius component having a variable radius with a ripple period along the axial centerline. An rf source outputs an axial electric field that propagates within the waveguide coaxial with the electron beam and has a radial mode that interacts with the electron beam at the equilibrium radius component of the electron beam.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings.

DETAILED DESCRIPTION OF THE INVENTION

In accordance with this invention, a new amplifier interaction mechanism between the electron beam and a fast-wave rf mode in a smooth waveguide is established, where an annular beam is radially rippled to establish synchronism. There is a uniform, axial magnetic field, and the beam ripple is caused by injecting the beam either displaced from its equilibrium position or with some initial radial velocity. The rf mode profile is unperturbed in the interaction region, leading to a smooth transition between the input signal and the growing mode and also between the growing mode and the output signal. The beam interacts with the axial electric field of a mode with a phase velocity greater than the speed of light and is bunched axially so that the interaction is in the class of the axial free-electron laser.

Figure 1:
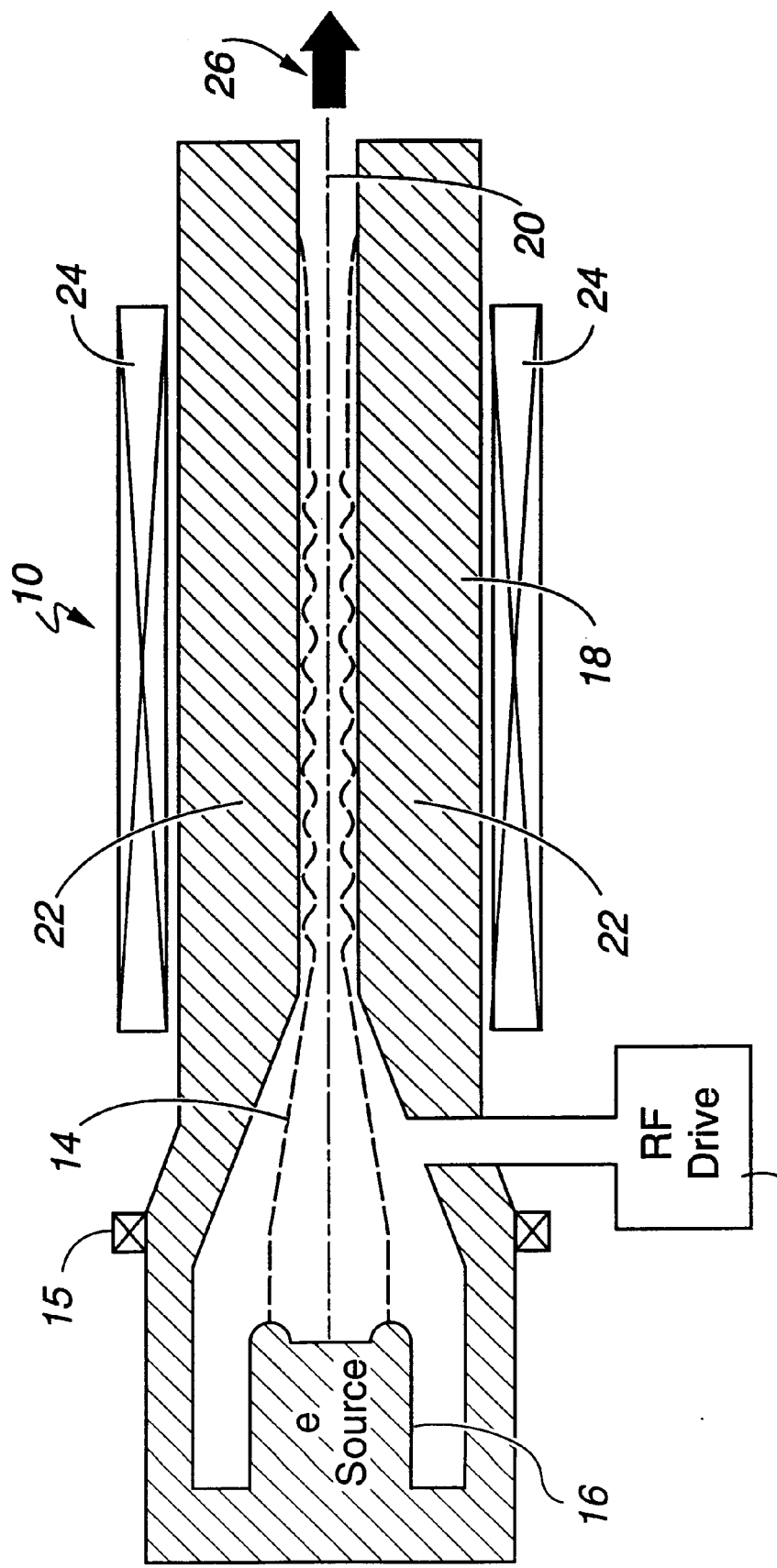
FIG. 1 is a pictorial illustration, in cross-section, of a FEL according to one embodiment of the present invention.

The rippled beam free-electron laser 10 is shown in FIG. 1. An annular electron beam 14 is generated by electron source 16 and slightly perturbed by magnet 15 to enter waveguide 18 at a slight angle and traveling from left to right. Alternatively, electron source 16 could be slightly off-set from the beam's equilibrium radius position centered about the center line 20 of the waveguide 18. An axial magnetic field produced by solenoid 24 confines the perturbed or off-set electron beam 14 to introduce a periodic ripple in the beam. An electromagnetic field is also established in the circular waveguide in a $TM_{0n}$ mode by the injection of rf from rf drive 12 and the dimensions of waveguide 18. The $TM_{0n}$ mode has at least one null position in the radial direction and electron beam 14 is controlled by the axial magnetic field produced by solenoid 24 to oscillate about the position of this null position (see FIG. 2). The phase velocity of the rf mode is greater than the speed of light so that the rf mode is overtaking the electrons in the electron beam.

Figure 2:
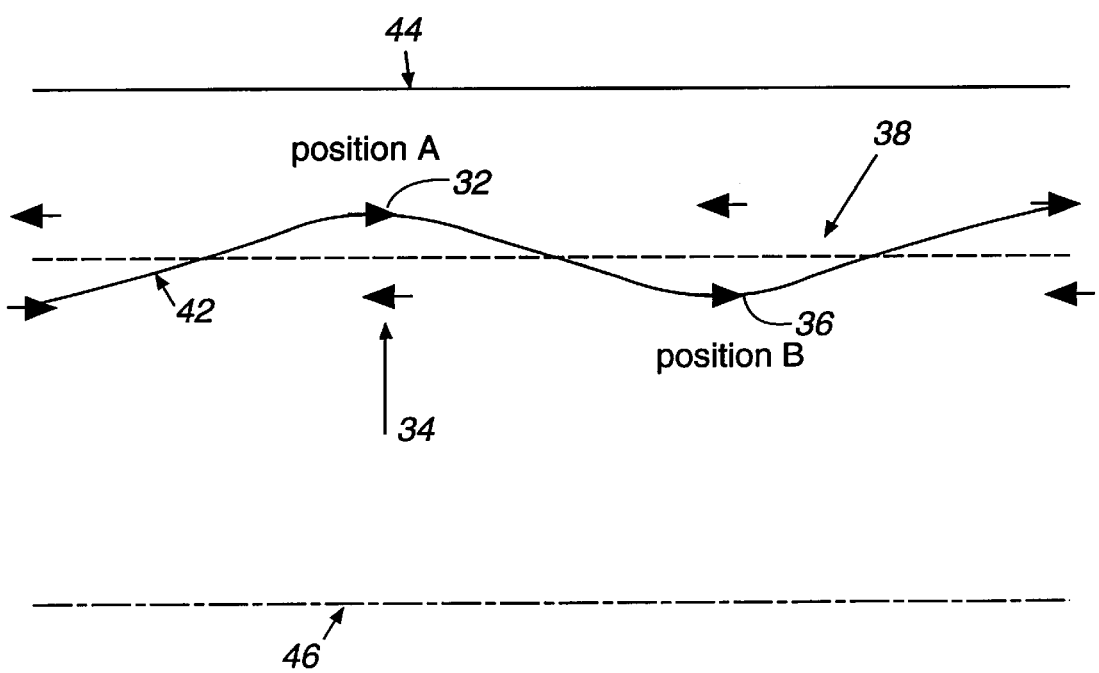
FIG. 2 depicts electron travel with a smooth waveguide relative to electric field orientation.

Now consider the synchronous interaction between electrons in an annular electron beam 42 within waveguide 44 and the rf mode shown in FIG. 2. A complete illustration is formed by rotating the components of FIG. 2 about center line 46 to form a figure of rotation. Assume an electron in electron beam 42 at position A 32 sees an electric field 34 retarding its motion. The electron then travels to position B 36, and now is on the other side of the equilibrium position 38 of oscillating electron beam 42.

Equilibrium position 38 of beam 42 is at a radial location where the axial strength of electric field 34 is changing with radial position of the field. The interaction between electron beam 42 and electric field 34 is strongest where the rate of change of field 34 is greatest. By way of illustration, the interaction shown in FIG. 2 assumes that equilibrium radius 38 is located at a radial null position for axial electric field 34. If exactly ½ rf wavelength has slipped by the electron as it moves from position A 32 to position B 36, axial rf electric field 34 will also retard the motion of the electron at position B 36 and a synchronous interaction has been established.

The physics associated with the rf/beam interaction shown in FIG. 2 is essentially the same as for all traveling-wave devices, including both axial and transverse free-electron lasers. One significant advantage of this new mechanism over other traveling-wave devices is the very simple design, requiring only a constant externally applied magnetic field and annular beam electron gun as illustrated in FIG. 1—but note that this interaction vanishes for a solid electron beam an the waveguide axis.

Because of the resulting nonlinearity in the electron orbit equations, an autoresonant phenomena also occurs. If the electron beam energy is changed, the synchronous wavelength of the ripple period is also changed. However, for intense electron beams, there can also be a very large change in the nature of the space-charge wave traveling with the beam, and, as a result, this interaction can be absolutely autoresonant, which means that both the gain and the phase of the rf output will not fluctuate for a small variation in the beam energy.

The preferred ripple amplitude is only 10–12% of the annulus radius for maximum gain of the rf. Increasing the gain much above about 12% results in a decrease in gain as the ripple trajectory acts to further decrease the average axial beam velocity.

The single-particle synchronism equation, $$\frac{\omega}{c\beta_z} = \frac{\omega}{v_p} + \frac{2\pi}{\lambda_r} \tag{1}$$

is exactly the same as for all free-electron laser (FEL) interactions. Here, $\omega$ is the radian mode frequency, c is the speed of light, $\beta_z$ is the electron's axial velocity normalized to the speed of light, $v_p$ is the phase velocity of the rf mode, and $\lambda_r$ is the period between ripples.

The resonant axial electric field seen by an electron at an arbitrary phase and a location z (measured relative to the ripple period) is given by $$E_z = Ak_c\kappa J_1(k_c r_0) \cos(k_r z) \cos(k_r z + \phi), \tag{2}$$

where the mode has a maximum on-axis axial field strength of A, $k_c$ is the mode's radial wave number, $\kappa$ is the maximum ripple amplitude, $r_0$ is the equilibrium annulus radius, $k_r$ is the ripple wave number ($k_r = 2\pi/\lambda$), and $\phi$ is the relative phase between the rf and the electron. The convention used herein is that a particle at a phase of $\phi = 0$ will be accelerated by the rf mode, at a phase of $\phi = \pi$ will give up energy to the mode, and at phases of $\pm \pi/2$ there will be no net energy transfer. For an intense electron beam, Eq. (1) is somewhat modified by the effects of the axial space-charge forces between particles.

This interaction is in the electron-cyclotron class, and shares some features with the cyclotron autoresonance maser (CARM) interaction, in which a thin, solid rotating electron beam interacts with the transverse electric field of a TE mode. Due to the inherent nonlinearities in the orbit equation, the rippled beam interaction can stay in resonance as either the axial magnetic field or the beam energy is changed, demonstrating autoresonance characteristics. It should also be noted that an annular rippled-beam free-electron laser and an annular beam longitudinal-wiggler free-electron laser share similar electron orbits, and the beam in both devices can interact with either the transverse electric field of a $TE_{0n}$ mode or the longitudinal electrical field of a $TM_{0n}$ mode. The rippled-beam free-electron laser is a somewhat simpler device because the longitudinal-wiggler free-electron laser requires a periodically rippled external axial-magnetic field, and the TM mode interaction is preferred due to a somewhat larger interaction for the same power flow in the mode. Note that the issue of using a TM or TE mode does not arise for the case of using a thin, solid beam; for a thin, solid beam gyrating symmetrically around the z axis, the time-averaged interaction with a TM mode vanishes. The CARM interaction with an annular beam requires a $TE_{1n}$ mode, where the beam is executing uniform cyclotron motion instead of axisymmetric cyclotron motion, but the interaction is not uniform azimuthally along the annular beam.

The radial equation of motion of the center of an annular beam in a uniform axial magnetic field is $$m\frac{d}{dt}\gamma\dot{r} = e\frac{E_r}{\gamma^{*2}} - ev_\theta(B_{ext} + B_{dia}) + \gamma m\frac{v_\theta^2}{r} \tag{3}$$

where r is the radial location of the beam center measured from the centerline of the axial magnetic field, a dot refers to a time derivative, $\gamma$ is the relativistic mass factor, m and e are the electronic mass and charge, respectively, $E_r$ is the radial space-charge force at that point, $\gamma^*$ is the effective relativistic mass factor from the beam's axial velocity only $[\gamma^* = (1-\beta_z^2)^{-\frac{1}{2}}]$, $v_\theta$ is the azimuthal velocity at the center of the annulus, $B_{ext}$ is the uniform externally applied magnetic field, and $B_{dia}$ is the diamagnetic axial field generated by the azimuthal rotation of the beam at that point, which opposes the externally applied magnetic field.

From Eq. (3), an equilibrium radius can be determined, given various injection parameters, and the ripple motion can be described, both in terms of the amplitude and the ripple period. For simplicity, only the motion of the center of the annulus will be considered. For small ripple amplitudes, this is adequate for finding the dispersion relation to first order in the ripple amplitude.

Figure 3:
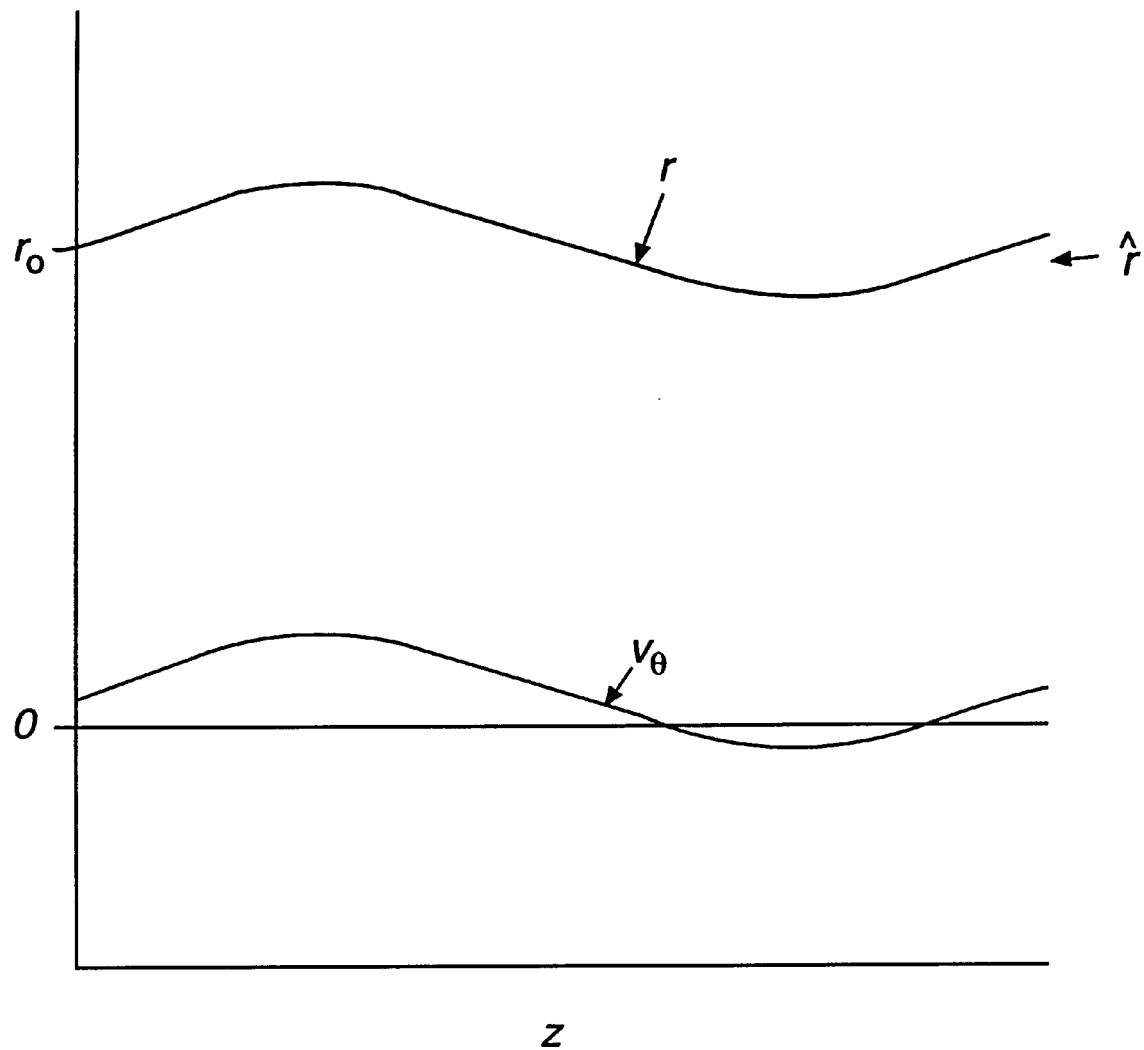
FIG. 3 graphically depicts radial beam position and azimuthal velocity versus axial position within a ripple.

The unknowns in Eq. (3) are the radial electric field, the axial beam velocity, the azimuthal beam velocity, and the diamagnetic axial field, which are all easily found. The azimuthal beam velocity as a function of position along a ripple period is shown in FIG. 3. Note that the annulus rotates first one way and the other, but with some net precession about the origin. Equations (4)–(9), below, now fully describe the equilibrium radius, orbit, including the ripple period, average axial velocity, and ripple amplitude. The complete derivation can be found in Carlsten, "Rippled beam free-electron laser amplifier using the axial free-electron laser interaction," 81 *J. Appl. Phys.* No. 10, pp. 6570–6578, (May 15, 1997), incorporated herein by reference. Note from Eq. (6) that the ripple amplitude is a sinusoidal function of time. It will be assumed herein that the ripple amplitude is also a sinusoidal function of axial position, which approximation will not lead to an error in the lowest order (in terms of $\kappa/r_0$) dispersion relation.

The equilibrium radius $r_0$ is given by $$r_o^2 = \frac{b + \sqrt{b^2 + 4\hat{r}^2}}{2}, \quad (4)$$

where $$b = \frac{I}{I_A} \left(\frac{\gamma cm}{eB}\right)^2 \frac{4}{\gamma \gamma^{*2} \beta_z}, \quad (5)$$

I is the beam current, $I_A = 4\pi\epsilon mc^3/e$, $\epsilon$ is the vacuum permittivity, $\hat{r}$ is the annulus center at some place where the azimuthal velocity vanishes, $r_0$ is the equilibrium radius, $B = B_{ext} + B_{dia}$ is the total magnetic field. Equations (4) and (5) fully describe the equilibrium radius in terms of the initial conditions, current and total axial magnetic field.

The beam radius is given by $$r = r_o + \kappa e^{j\left(eB\sqrt{(r_o^4 + \hat{r}^4)/2}/\gamma m v_o^2\right)t + j\phi}; \quad (6)$$

The rms azimuthal velocity is given by $$\bar{\beta}_\theta = \frac{eB}{cm\gamma} \kappa \left(\frac{1}{2} + \cos^2(\phi)\right)^{1/2}, \quad (7)$$

where $\cos(\phi) = -(r_0 - \hat{r})/\kappa$.

The rms radial velocity is approximately $$\bar{\beta}_r = \frac{eB}{cm\gamma} \kappa \frac{1}{\sqrt{2}}. \quad (8)$$

The average axial velocity is now given by $$\bar{\beta}_z^2 = 1 - \frac{1}{\gamma^2} - \bar{\beta}_r^2 - \bar{\beta}_\theta^2 \quad (9)$$

Next, the dispersion relation to lowest order in the ripple amplitude for the rippled-beam amplifier is derived assuming that the beam interacts with only a single waveguide mode, which is a good approximation for a fast-wave interaction with moderate gain, as in the present case. Assume that the rf current density i, the rf axial velocity v, the rf beam density ρ, and the axial electric field of the mode at the center of the waveguide E can all be written in the form $$i_t = i_0 + ie^{j\omega t - \Gamma z}$$

$$v_t = v_0 + ve^{j\omega t - \Gamma z}$$

$$\rho_t = \rho_0 + \rho e^{j\omega t - \Gamma z}$$

$$E_t = E_0 + Ee^{j\omega t - \Gamma z - jk_s z} \quad (10)$$

where $\Gamma z$ is the axial phase, the subscript t indicates the total including the dc components. The $jk_s z$ term in the field expression provides for the slippage.

The purpose of deriving a dispersion relation is to find a quartic relation between ω and propagation constant Γ. The solution for Γ may have both a real and imaginary component—the real component is the mode's exponential growth or decay and the imaginary component is the mode's wave number, which must be close to the beam's slow space-charge wave number for a resonant interaction [for very low beam currents, the slow space-charge wave number approaches the beam's wave number, and the single-particle resonance condition, Eq. (1), is recovered]. The dispersion relation is found by solving for the ratio of E/ρ from first the electronic equation of motion (how the rf drives the electrons), and then from the wave equation (how the electrons drive the rf). By equating these two ratios, the desired quartic equation is generated:

$$\left[(\beta_e + j\Gamma)^2 + (\Gamma^2 + k^2)\hat{\beta}_q^2\right] = -\frac{(k^2 + \Gamma^2)\beta_e K \beta_1^3}{[(\Gamma - jk_r)^2 + \beta_1^2]k_c^2 R_o}, \quad (11)$$

where $k_c$, the mode's radial cutoff wave number, is the $n^{th}$ zero of the $J_0$ Bessel function for a $TM_{0n}$ mode divided by the waveguide radius $r_w$; $\beta_e = \omega/v_0$ is the beam propagation constant; $k = \omega/c$ is the free-space wave number; $\hat{\beta}_q^2$ is the normalized space charge wave number, $$\hat{\beta}_q^2 = 2\chi_o \frac{I}{I_A \gamma^3 \beta_z^3} \ln\frac{r_w}{r_o},$$

where $\chi_0$ is a geometric space-charge reduction factor; K is the coupling impedance at the location of the beam relative to the peak synchronous electric field; $\beta_1$ is the cold propagation constant for mode 1, and $$R_o = 2\frac{\gamma^3 m v_o^2}{eI}$$

is the beam impedance.

The dispersion relation is now written as $$[(\beta_e + j\Gamma)^2 + (\Gamma^2 + k^2)\hat{\beta}_q^2][(\Gamma - jk_r)^2 + \beta_1^2] = 2\beta_1^4 C^3 \frac{(k^2 + \Gamma^2)}{k_c^2} = 0, \quad (12)$$

where C is Pierce's gain parameter, defined by $$C^3 = \frac{K\beta_e}{2R_o\beta_1}.$$

The following are some examples of numerical solutions for Eq. (12), along with orbit equations, Eqs. (4), (6), (7), and (8). For a nominal case, assume a 4.5 kA, 650 keV electron beam with an annulus radius of 2.9 cm in a waveguide with radius of 3.37 cm. A 17 GHz signal in the $TM_{02}$ mode will have a cutoff wave number of $k_c=1.63.8$ $m^{-1}$ in this waveguide, with an axial wave number of $\beta_1=316.4$ $m^{-1}$. Additionally, assume that there is an inner conductor in the waveguide, located at the radius of the first axial electric field null of the $TM_{02}$ mode (at 1.47 cm), which will not affect the mode pattern, but will reduce the power required for a given field strength and thereby increase the gain parameter K. The power P in a hollow waveguide of radius a and cutoff frequency $\omega_c$ for an on-axis amplitude A of a $TM_{0n}$ mode is given by $$P = A^2 \frac{\pi \left(\frac{\omega}{\omega_c}\right)^2 \sqrt{1 - \left(\frac{\omega}{\omega_c}\right)^2} a^2}{4\sqrt{\mu/\varepsilon}} J_1^2(k_c a) \quad (13)$$

where $\mu$ is the permeability of a vacuum.

The power required is reduced by nearly 45% by including the inner conductor, and is $P_{req}=A^2 6.43(10^{-7})W$.

The space charge term $\chi_0$ can be evaluated by assuming $j\Gamma$ is very close to $\beta_e$, in which case h ($h^2=(j\Gamma)^2-k^2$, $k=\omega/c$) becomes close to 175 $m^{-1}$ and $\chi_0$ is about 0.5. Using these numbers, the space charge term used in the dispersion relation is now $\hat{\beta}_q^2=0.00358/\beta_z^3$.

These values, plus the self-consistent solution of the orbit equation used to determine (1) $\kappa$, which is needed for the normalized gain K, (2) $\beta_z$, which is needed for the beam propagation constants $\beta_e$ and $\hat{\beta}_q^2$ and (3) the ripple period $k_r$), fully specify the dispersion relation which is solved using a quartic solver.

Figure 4A:
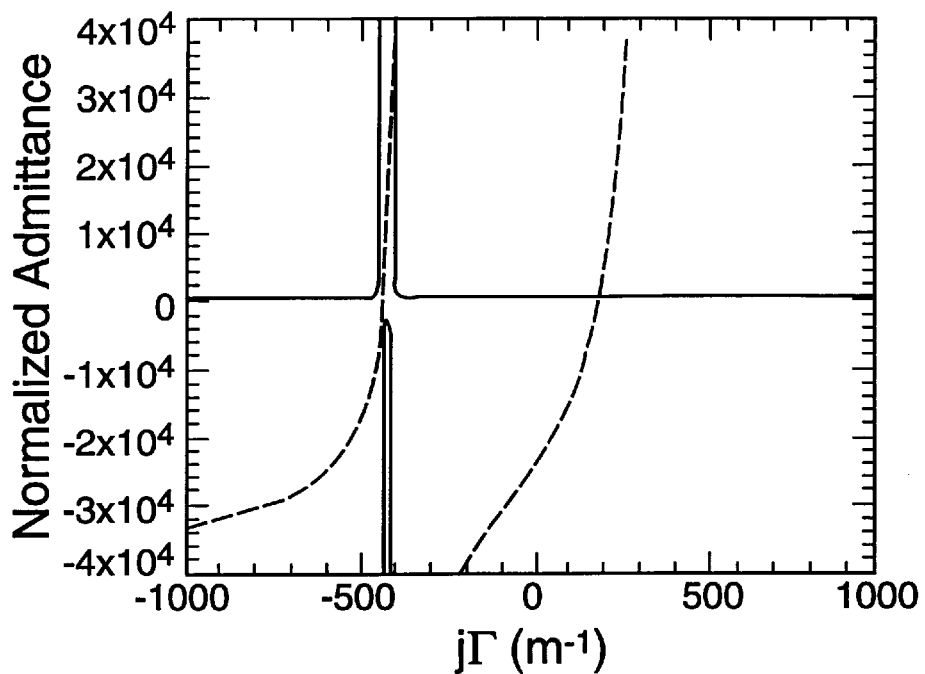
FIG. 4A graphically depicts normalized electronic admittance (solid line) and normalized circuit admittance (dashed line) plotted as a function of complex gain jΓ.

A nominal ripple case will be a 10% ripple with a period of 5.19 cm (an axial field of 0.40 T). This ripple period and ripple amplitude leads to a gain of about 26 dB/m of interaction. In order to understand the interaction, in FIG. 4A, the normalized electronic admittance $\{2\beta_1^4 C^3/[(\beta_e+j\Gamma)^2+(\Gamma^2+k^2)\hat{\beta}_q^2]\}$ and the normalized circuit admittance $\{-[(\Gamma-jk_r)^2+\beta_1^2]k_c^2/(k^2+\Gamma^2)\}$, is shown as a function of $j\Gamma$ (the dashed line is the circuit admittance and the solid line is the electronic admittance). The dispersion relation is satisfied where these two curves meet, in which case $\Gamma$ is purely imaginary (there is no gain). Since the dispersion relation is quartic, there will always be four roots, and, in order to have gain, there must be only two intersections between these two curves (as in FIG. 4A, there is one at a wave number of about 200 $m^{-1}$ and a second above the plot at about $-395$ $m^{-1}$). In order to have a root with gain, as the circuit admittance crosses the $j\Gamma$ axis, it must pass through the left gap where the electronic admittance separates due to the slow space-charge wave. The left gap is at a location of $j\Gamma=-\beta_e-\sqrt{|\Gamma^2+k^2|}\hat{\beta}_q^2$, and the circuit admittance crosses the axis at $j\Gamma=-\beta_1-k_r$. Defining a detuning $\Delta$ as $\Delta=\beta_e-\beta_1-k_1$, there can be a mode with gain only if the detuning roughly equals $-\sqrt{|\Gamma^2+k^2|}\hat{\beta}_q^2$ (which is the so-called space-charge wave number). Note that if there is no appreciable space charge, the single electron dispersion relation is regained.

With space charge and small ripple amplitudes, the detuning is changed by varying the axial magnetic field; by increasing the magnetic field, the ripple period decreases and the ripple wave number $k_r$ increases, making the detuning more negative and shifting the circuit admittance curve more to the left.

However, for large ripple amplitudes, another interesting feature also appears. As the magnetic field is increased, the average axial velocity also drops, making both $\beta_e$ and $\hat{\beta}_q$ larger, and moving the slow space-charge wave gap in the electronic admittance also to the left. For small ripple amplitudes, the movement in the electronic admittance is small compared to the movement in the circuit admittance, and a detuning leading to resonance can always be found by varying the axial magnetic field. For large amplitudes, the movement in the electronic admittance is larger than the movement in the circuit admittance, the slow space-charge wave gap is always further to the left than the lowest zero-crossing of the circuit admittance, and there is no ripple amplitude that will lead to resonance. Because the amount of space-charge determines the separation between the slow and fast space-charge wave gaps, this effect becomes worse as the beam current is increased.

There is a peculiar regime in between these extremes where the movements are matched, and there is resonance for a very large range of axial magnetic fields and resulting ripple periods. Alternatively, since the ripple period depends on the beam energy, this means that when this condition is satisfied, a beam will stay in resonance as it loses energy to the rf field. This form of autostable resonance is similar to that seen in CARM amplifiers.

Figure 4B:
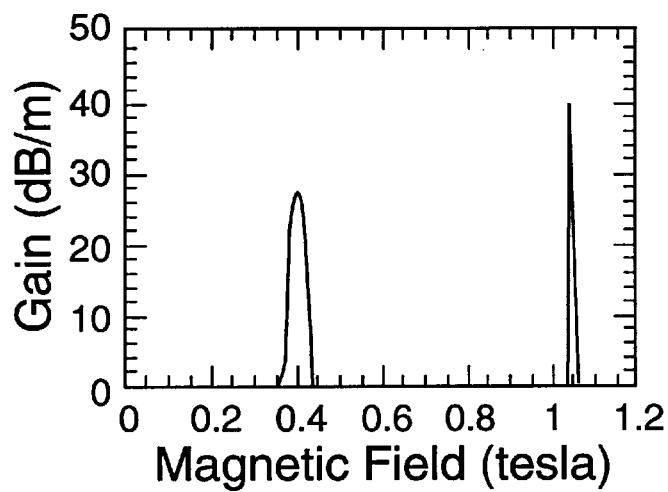
FIG. 4B graphically depicts gain as a function of magnetic field for a 10% beam ripple.

In FIG. 4B, the gain per meter of interaction length is plotted as a function of the applied magnetic field for a 10% ripple amplitude. Note that there are two regions of gain—one fairly wide with a field ranging from 0.38 to 0.42 T, and a second, more narrow region at a field of about 1.05 T. Resonance is established in the first region with a fairly high $\beta_z$, where the axial field effectively only modifies the ripple period. Resonance is established in the second region with a relatively low $\beta_z$ (<0.5), where the increasing axial field mostly increases the space-charge wave number $\hat{\beta}_q^2$.

Figure 4C:
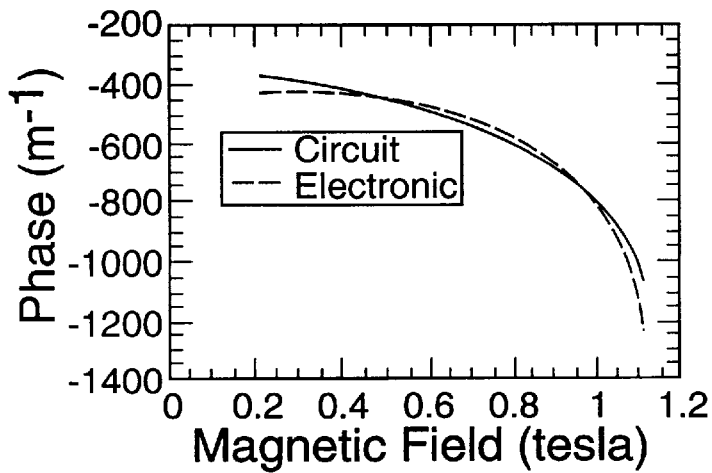
FIG. 4C graphically depicts the location of the zero crossing of the circuit admittance and approximate location of the center of the gap in the electronic admittance corresponding to the slow space-charge wave.

FIG. 4C graphically depicts both the zero crossing of the circuit admittance $(-\beta_1,-k_r)$ [shown by a solid line] and the approximate center of the gap in the electronic admittance corresponding to the slow space-charge wave gap $(-\beta_e,-\beta_e\sqrt{\hat{\beta}_q^2})$ [shown by dashed line] as functions of the applied axial magnetic field. As the magnetic field is increased, the zero-crossing of the circuit admittance first becomes more negative faster (moves to the left in FIG. 4A), and the gap of the electronic admittance then moves faster to the left. For this case, there are two magnetic fields where they are at the same position (and, thus, two resonances).

FIGS. 5A–5E graphically depict gain curves for beam currents of 2, 15, 18, 22, and 25 kA, as functions of the externally applied axial magnetic field, all with a beam kinetic energy of 650 keV, with 10% ripple amplitude, and with the beam radius and wall radius used for the nominal case. Because of the potential depression of the beam, this means that the injection energy of these cases are different. The injection energy for a 2 kA, 4.5 kA, 15 kA, 22 kA, and 25 kA beam with a kinetic energy of 650 keV is 671 keV, 698 keV, 871 keV, 890 keV, 916 keV, and 954 keV, respectively. In this comparison, the kinetic energy of the beam is kept constant, because then only the space-charge wave number will increase with increasing beam current, and the physics of interest is less ambiguous. Note that the increase in current will move the slow space-charge wave gap to the left in FIG. 4A.

Figure 5A:
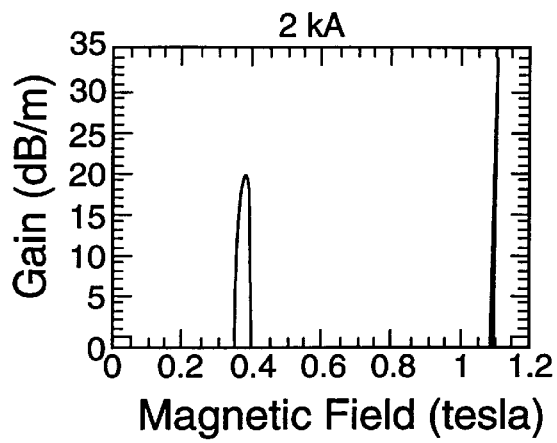
FIGS. 5A–E are gain curves for a 650 keV beam as the current is changed to 2 kA, 15 kA, 18 kA, and 25 kA, respectively.

In FIG. 5A, the gain curve for the 2 kA case is depicted. The gain is lower, the peaks are separated more, and the width of the peaks has been reduced. The peaks are lower because of the decrease in the gain parameter C, which depends linearly on current. The decrease in the width of the peaks and the increase in their separation is due to the fact that the curves representing the zero-crossing of the electronic admittance and the slow space-charge wave gap of the electronic admittance are now more separated (the curve for the electronic admittance in FIG. 4C would be moved slightly to the right). It should be realized that, even for very low space-charge, that a second peak will always occur. Eqs. (7)–(9) show that the axial beam velocity vanishes if the axial magnetic field is about cm $\sqrt{\gamma^2-1}/e\kappa$, which is 1.2 T for these cases.

Figure 5B:
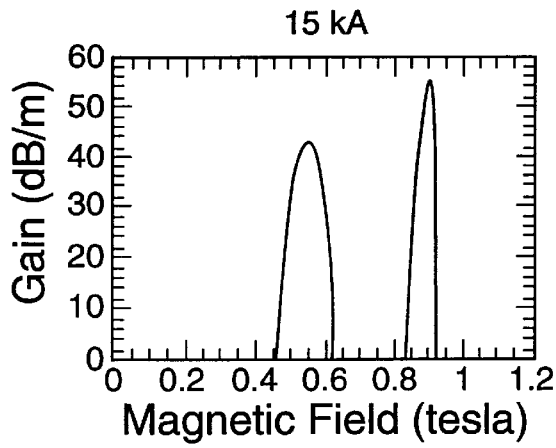
Figure 5C:
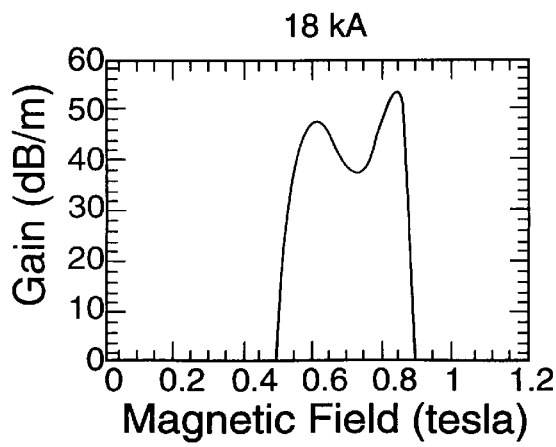
Figure 5D:
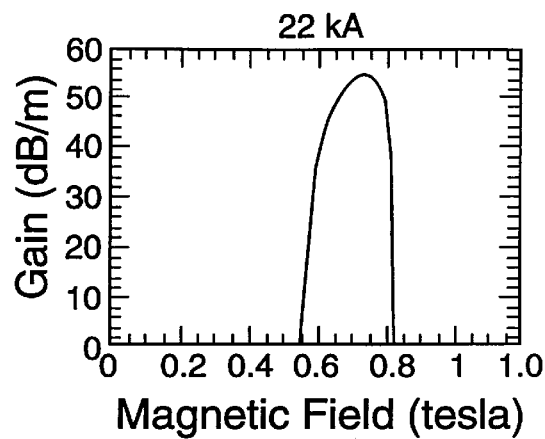

In FIG. 5B, the 15 kA case is shown. Now the peaks are larger (from the increase in current), and the peaks are wider and closer (from better overlap of the zero-crossing of the electronic admittance and the gap in the electronic admittance due to the slow space-charge wave). As the beam current in increased to 18 kA (FIG. 5C), the peaks have merged, with a very large overall width (nearly 50%). At 22 kA (FIG. 5D), the zero-crossing of the circuit admittance and the gap in the electronic admittance and the gap in the electronic admittance due to the slow space-charge wave are cotangent at a magnetic field of about 0.7 T. This is the condition of auto-stable resonance, and, indeed, the first derivative of the phase and of the amplitude of the gain with respect to energy vanish at this point.

Figure 5E:
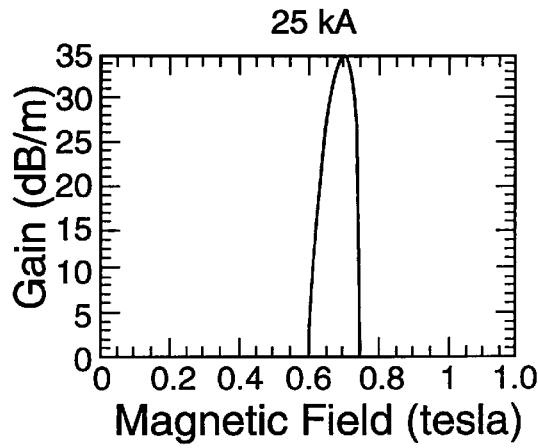

At a beam current greater than about 22 kA, the zero-crossing of the electronic admittance is always to the right of the center of the slow space-charge wave gap (the curves in FIG. 4C would now have separated apart—the electronic curve would have moved enough to the left of the circuit curve that no intersections occur). However, due to the large gap width, gain in still possible (the gain curve for 25 kA is shown in FIG. 5E). Note the decrease in gain relative to the 22 kA case, even though the gain parameter has increased due to the increase in current. No gain is observed for currents in excess of 27 kA.

Figure 6:
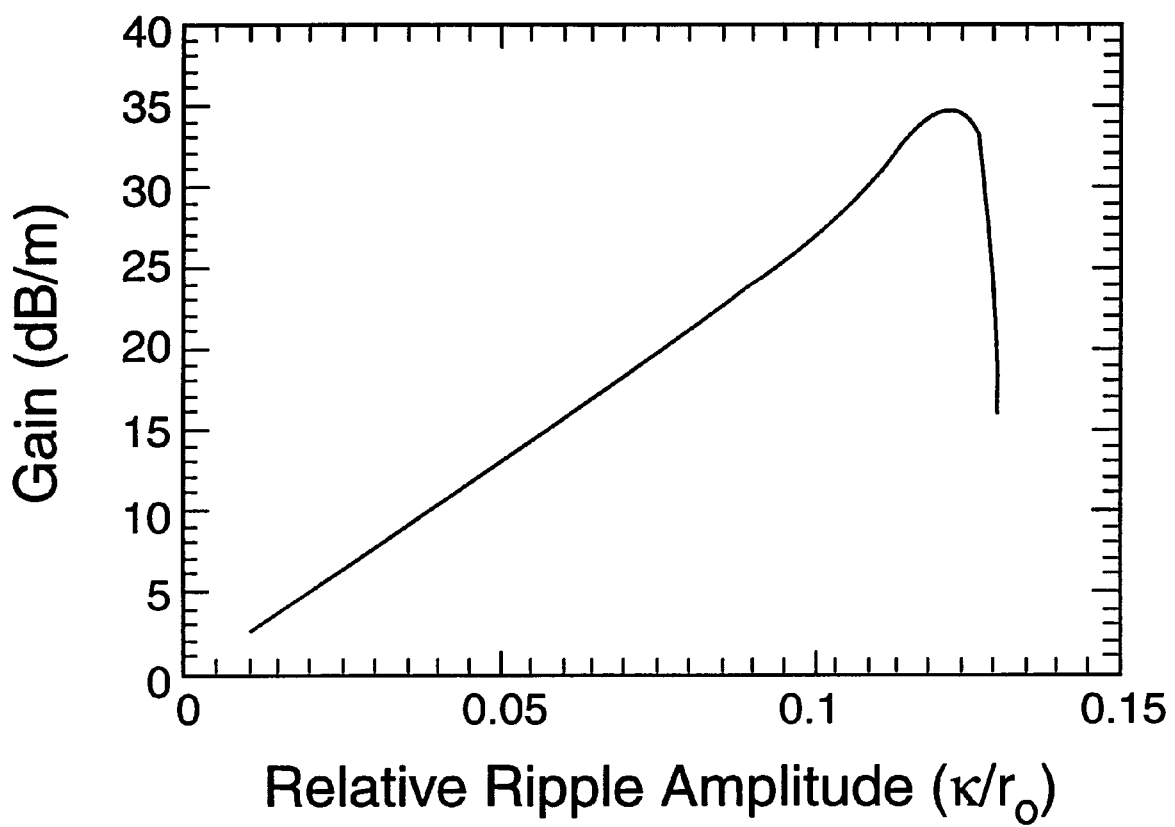
FIG. 6 graphically depicts gain versus ripple amplitude for a 4.5 kA, 650 keV electron beam.

FIG. 6 graphically shows the gain as a function of the ripple amplitude for 4.5 kA (where the magnetic field has been adjusted for maximum gain of the wider resonance). For small amplitudes, the gain is linear with ripple amplitude (as expected from the increase in the gain parameter). The effect of the larger ripple (in addition to increasing the gain parameter) is to decrease the average axial beam velocity and to move the electronic curve of FIG. 4C to the left. Auto-stable operation is reached for 4.5 kA with a ripple amplitude of 12%; no gain is observed if the ripple amplitude is much greater than 13%.

The foregoing description of the rippled beam free-electron laser amplifier using the axial free-electron laser interaction has been presented for purposes of illustration and description and is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A free electron laser amplifier comprising:

a waveguide defining an axial centerline and having a wall that is smooth and symmetric about said centerline;

a solenoid arranged about said waveguide for producing an axial constant magnetic field within said waveguide;

an electron beam source for outputting a annular electron beam that interacts with said axial magnetic field to have an equilibrium radius component and a ripple radius component having a variable radius with a ripple period along said axial centerline; and an rf source for outputting an axial electric field that propagates within said waveguide coaxial with said electron beam and has a radial mode that interacts with said electron beam at said equilibrium radius component of said electron beam;

said axial electric field and said ripple period of said electron beam interacting to produce an autoresonance effective to change said ripple period to maintain synchronism between said axial electric field and said ripple period as energy is transferred from said electron beam to said electric field.

2. A free electron laser amplifier according to claim 1, wherein said propagating electric field is in a TM mode.

3. A free electron laser amplifier according to claim 1, wherein said variable radius of said electron beam is about 10 to 12% of said average radius component.

4. A free electron laser amplifier according to claim 2, wherein said variable radius of said electron beam is about 10 to 12% of said average radius component.

5. A free electron laser amplifier according to claim 1, wherein said wave guide has radial dimensions, said solenoid generates an axial constant magnetic field strength, said electron beam source produces a current with a ripple radius component and ripple period, and said rf source has a radial mode, respectively, effective to define circuit admittance values and electronic admittance values that produce an amplification of said electric field.

6. A free electron laser amplifier according to claim 5, wherein said electronic admittance values have a gap at a phase value of propagation constant $j\Gamma$ corresponding to a zero value of said circuit admittance to produce said condition of autoresonance between said electron beam and said electric field.

* * * * *